US011122239B2

(12) United States Patent
Dickins et al.

(10) Patent No.: US 11,122,239 B2
(45) Date of Patent: Sep. 14, 2021

(54) DETECTING AND MITIGATING AUDIO-VISUAL INCONGRUENCE

(71) Applicant: Dolby Laboratories Licensing Corporation, San Francisco, CA (US)

(72) Inventors: Glenn N. Dickins, Como (AU); Ludovic Christophe Malfait, Belmont, CA (US); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/786,799

(22) Filed: Feb. 10, 2020

(65) Prior Publication Data

US 2020/0177837 A1 Jun. 4, 2020

Related U.S. Application Data

(62) Division of application No. 15/918,214, filed on Mar. 12, 2018, now Pat. No. 10,560,661.
(Continued)

(30) Foreign Application Priority Data

Jul. 12, 2017 (EP) .................................... 17180873

(51) Int. Cl.
*H04N 7/15* (2006.01)
*H04N 7/14* (2006.01)
*G06K 9/00* (2006.01)

(52) U.S. Cl.
CPC ........... *H04N 7/15* (2013.01); *G06K 9/00288* (2013.01); *G06K 9/00362* (2013.01); *H04N 7/147* (2013.01)

(58) Field of Classification Search
USPC ...................................................... 348/14.03
See application file for complete search history.

(56) References Cited

U.S. PATENT DOCUMENTS

| 5,335,011 A | 8/1994 | Addeo |
| 5,500,671 A | 3/1996 | Andersson |

(Continued)

FOREIGN PATENT DOCUMENTS

| EP | 1784020 | 5/2007 |
| EP | 2352290 | 8/2011 |

(Continued)

OTHER PUBLICATIONS

Andre, Cedric R. "Audiovisual Spatial Congruence, and Applications to 3D Sound and Stereoscopic Video" Department of Electrical Engineering and Computer Science, Faculty of Applied Sciences, University of Liege, Belgium, Thesis, Doctor of Philosophy (PhD) in Engineering Sciences, Dec. 2013.
(Continued)

*Primary Examiner* — Amal S Zenati

(57) ABSTRACT

Systems and methods are described for detecting and remedying potential incongruence in a video conference. A camera of a video conferencing system may capture video images of a conference room. A processor of the video conferencing system may identify locations of a plurality of participants within an image plane of a video image. Using face and shape detection, a location of a center point of each identified participant's torso may be calculated. A region of congruence bounded by key parallax lines may be calculated, the key parallax lines being a subset of all parallax lines running through the center points of each identified participant. When the audio device location is not within the region of congruence, audio captured by an audio device may be adjusted to reduce effects of incongruence when the
(Continued)

captured audio is replayed at a far end of the video conference.

12 Claims, 11 Drawing Sheets

Related U.S. Application Data

(60) Provisional application No. 62/523,125, filed on Jun. 21, 2017, provisional application No. 62/472,471, filed on Mar. 16, 2017.

(56) References Cited

U.S. PATENT DOCUMENTS

| | | | |
|---|---|---|---|
| 5,548,346 | A | 8/1996 | Mimura |
| 7,126,627 | B1 | 10/2006 | Lewis |
| 7,586,513 | B2 | 9/2009 | Muren |
| 7,612,793 | B2 | 11/2009 | Potekhin |
| 8,503,655 | B2 | 8/2013 | Sandgren |
| 9,172,957 | B2 | 10/2015 | Grange |
| 9,351,070 | B2 | 5/2016 | Ojala |
| 2002/0191071 | A1 | 12/2002 | Rui et al. |
| 2003/0053680 | A1 | 3/2003 | Lin |
| 2006/0165184 | A1 | 7/2006 | Purnhagen et al. |
| 2008/0126104 | A1 | 5/2008 | Seefeldt |
| 2009/0046864 | A1* | 2/2009 | Mahabub .......... H04S 7/30 381/17 |
| 2009/0326959 | A1 | 12/2009 | Herre et al. |
| 2010/0328419 | A1 | 12/2010 | Etter |
| 2014/0337016 | A1* | 11/2014 | Herbig .......... H04M 3/568 704/201 |
| 2015/0078556 | A1 | 3/2015 | Shenoy |
| 2016/0007132 | A1 | 1/2016 | Peters |
| 2016/0036987 | A1 | 2/2016 | Cartwright |
| 2016/0134988 | A1 | 5/2016 | Gorzel |

FOREIGN PATENT DOCUMENTS

| | | |
|---|---|---|
| EP | 2568702 | 3/2013 |
| WO | 2013058728 | 4/2013 |
| WO | 2014111829 | 7/2014 |
| WO | 2014188393 | 11/2014 |
| WO | 2016081412 | 5/2016 |
| WO | 2016081655 | 5/2016 |

OTHER PUBLICATIONS

Franck, A. et al "Optimization-Based Reproduction of Diffuse Audio Objects" IEEE Applications of Signal Processing to Audio and Acoustics, New Paltz, New York, Oct. 2015, pp. 1-5.

Zhang, W. et al "Surround by Sound: A Review of Spatial Audio Recording and Reproduction" Applied Sciences, May 20, 2017.

* cited by examiner

DETECTING AND MITIGATING AUDIO-VISUAL INCONGRUENCE

CROSS-REFERENCE TO RELATED APPLICATIONS

This application is a divisional of U.S. patent application Ser. No. 15/918,214 filed Mar. 12, 2018, which claims the benefit of priority to European Patent Application No. 17180873.6 filed Jul. 12, 2017, U.S. Provisional Patent Application No. 62/523,125 filed Jun. 21, 2017, and U.S. Provisional Patent Application No. 62/472,471 filed Mar. 16, 2017, all of which are incorporated herein by reference in their entirety.

TECHNICAL FIELD

Embodiments herein relate generally to audio signal filtering, and more specifically to detecting the presence of incongruence and describing various approaches to mitigate the detected incongruence.

SUMMARY OF THE INVENTION

Systems and methods are described for detecting and remedying potential incongruence in a video conference. The video conference video capture may be provided by a camera of a video conferencing system and audio capture may be provided by an audio device. A camera of a video conferencing system may capture video images of a conference room. A processor of the video conferencing system may identify locations of each of a plurality of participants within an image plane of a video image of the captured video images. Using face and shape detection, a location of a center point of each identified participant's torso may be calculated. A region of congruence bounded by key parallax lines may be calculated, the key parallax lines being a subset of all parallax lines running through the center points of each identified participant. A location of the audio device within the conference room is identified using an audio test, a video test, and/or some other suitable technology.

The identified location of the audio device may then be compared to the calculated region of congruence within the conference room. When the audio device location is not within the region of congruence, audio captured by the audio device may be adjusted by adapting a captured audio signal to reduce effects of incongruence when the captured audio is replayed at a far end of the video conference. The adapting may take several forms. For example, the captured audio may be changed from full spatial audio to single-channel audio, or a width of a spatial render associated with the captured audio signal may be reduced.

In an embodiment, audio may be filtered or substantially decorrelated, to at least partially ambiguate spatial audio cues in the captured (or rendered) audio, when potential incongruence is detected. The presence of potential incongruence in far end play back of the captured video images together with playback of the audio stream may be determined based on a location of the audio device within the conference room, as described above. The captured audio stream may be filtered in response to the determining that potential incongruence is present by decoding the captured audio stream into a plurality of channels, the plurality of channels having a structured spatial relationship. Random phase values that are band-limited may be assigned to each of the plurality of channels to modify the captured audio stream. The modified audio stream may be spline interpolated. Filters may be constructed by interpolating a full filter response between the assigned random phase values.

Another embodiment of the present invention describes a video conferencing system. The video conferencing system may include a single camera and an audio controller communicatively coupled to the camera. The single camera may capture video images of a room in which the video conferencing system is broadcasting and receiving video conference data from. The audio controller may include a processor configured identify locations of each of a plurality of participants within an image plane of a video image of the captured video images. Using face and shape detection, the processor may calculate a location of a center point of each identified participant's torso. The processor may be further configured to calculate a region of congruence bounded by key parallax lines, the key parallax lines being a subset of all parallax lines running through the center points of each identified participant. The processor may use an audio test, a video test, or any suitable technology to identify a location of an audio device within the conference room. When the audio device location is not within the region of congruence, the processor may adjust the audio captured by the audio device, the adjusting comprising adapting a captured audio signal to reduce effects of incongruence when the captured audio is replayed at a far end of the video conference.

In addition to the foregoing, embodiments are described to increase robustness in the detection of potential incongruence. For example, an ellipse may be calculated around each calculated center point. The calculated region of congruence may be adjusted by redefining boundaries of the adjusted region of congruence to be lines from the calculated center point of an identified participant that are tangential to the ellipse around the calculated center point of each other identified participant, instead of the key parallax lines.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1A:
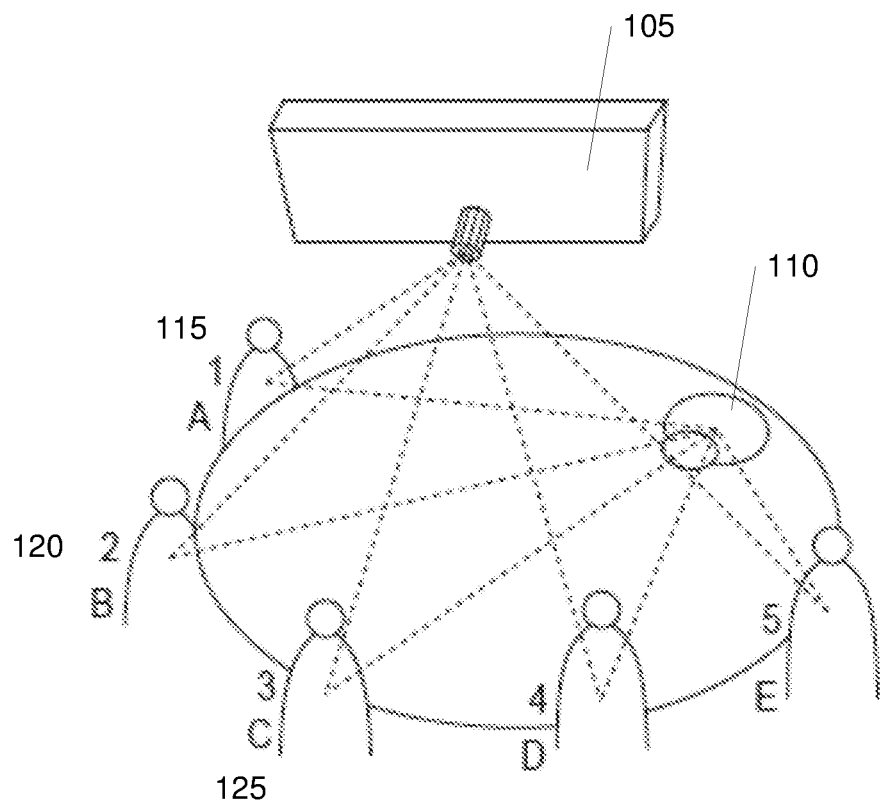
FIGS. 1A-B show schematic plan views of a video conferencing system illustrating examples of equipment arrangements within a conference room.

Communications systems, such as video conferencing systems, may have the ability to incorporate spatial audio. In such systems, there can be issues around the relative points of view or spatial consistency of the video and audio i.e. the congruence of the media. In particular, there are situations where it may not be possible to obtain or reproduce video and audio that is congruent or spatially consistent to the viewer. The described embodiments present a set of situations and criteria for where potential incongruence may occur, and options for mitigating the potential perceptual incongruence (using audio filtering, for example). The adopted approach may be natural and still retain some of the spatial audio aspects of the captured audio.

Rotation and translation of the audio at the point of capture or render may be used to improve congruence. Examples of such solutions are described in related U.S. Prov. Pat. App. No. 62/433,188 ("the '188 application"), entitled "Multimodal Spatial Registration of Devices for Congruent Multimedia Communications," filed on Dec. 12, 2016 and hereby incorporated by reference. However, in some cases, there is no feasible manipulation of a single point of view audio that can resolve the audio-video incongruence. This may particularly be apparent when a conference participant moves in a way that causes a large range of angular change to either the audio or video capture device, while remaining in substantially the same direction for the other capture device. In an extreme case, no audio operation will allow for a match of the translation in video and audio. Since it is noted that active participants will generally avoid being too overlapped for the camera (assuming the camera is located close to the screen or visual interest point to the participants), the most problematic issue arises when then audio device is located significantly off axis to the camera. In particular, the case where the participants dither across the audio device center line while being spread across the camera field of view presents a case where the alternation of audio directivity (even though only slight) is in distinct and disturbing contrast to the linear arrangement on the video. This case is discussed in greater detail below, in the text accompanying FIG. 7. Even if such situations are only infrequent, a solution is desired that can adapt without calling attention to the problem or deficiency of the system.

A detector is proposed for the situations where this congruence issue arises. First, consider an audio sensor that is able to detect audio from a particular horizontal arc, and map this across a horizontal image plane. In this way, the goal of congruence is to ensure the relative ordering of subject image points on the screen corresponds to the same ordering that is heard in the audio. It is assumed at this stage that the audio sensor is not pulling apart individual audio objects, which would allow a more flexible re-render. This is a challenging task without sacrificing the general ambience and room presence. The mapping from the microphone capture to the render may be continuous in the sense of preserving relative spatial orientation and moving. The mapping from the room to the camera image is generally affine and thus has a similar ordering property from its point of view.

Figure 1B:
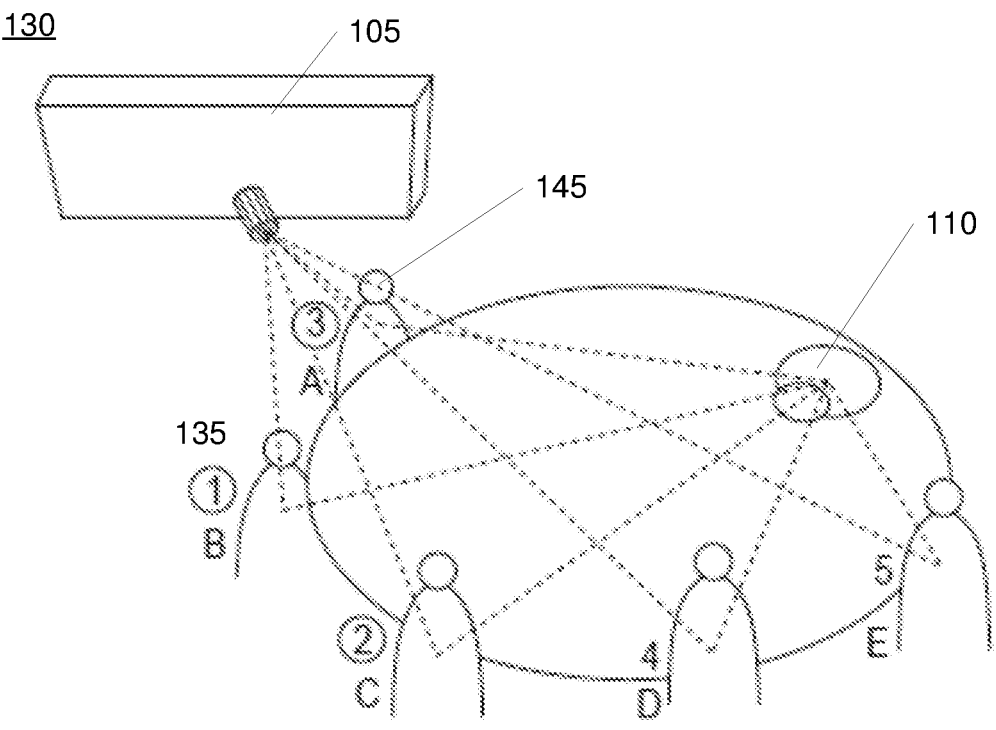

If the audio sources or participants are numbered in an ordered fashion, as would be seen in the video reference frame, and compared to an ordered labeling in the audio reference point of view, congruence may be achieved if both label sets are monotonic, or paired in order. FIGS. 1A-B show schematic plan views of a video conferencing system in a conference room illustrating examples of equipment arrangements within the conference room. The exemplary conference rooms 100 and 130 each include a video conferencing system 105, and some additional premium or highly accessible audio conferencing system, displayed as external audio device 110. As seen in FIGS. 1A-B, there is a situation of multiple connectivity tools in place simultaneously. Both a video conferencing system 105 and premium audio conferencing tool 110 are in use.

The external device for capturing audio 110 is positioned on the table in a room with several participants, such as participants 115, 120, and 125. They are looking at a screen device 105 on the wall, which also houses a camera 105 for taking video input from the room. In the arrangement in conference room 100, there is potential for congruence, as the left-to-right arrangement of the participants 115, 120, and 125 is the same for both the camera 105 and the audio device 110. However, the arrangement in conference room 130 includes an inversion in participants 145, 135, and 140. From the perspective of camera 105, the left-to-right order of the participants is 135, 140, and 145. However, from the perspective of audio device 110, the left-to-right order is 145, 135, 140, causing potential incongruence in playback at a far end of the video conference. Note that the lines in conference rooms 100 and 130 are drawn from the participant chest—this is intentional to sit in the same horizontal capture plane as the audio capture device.

Figure 2:
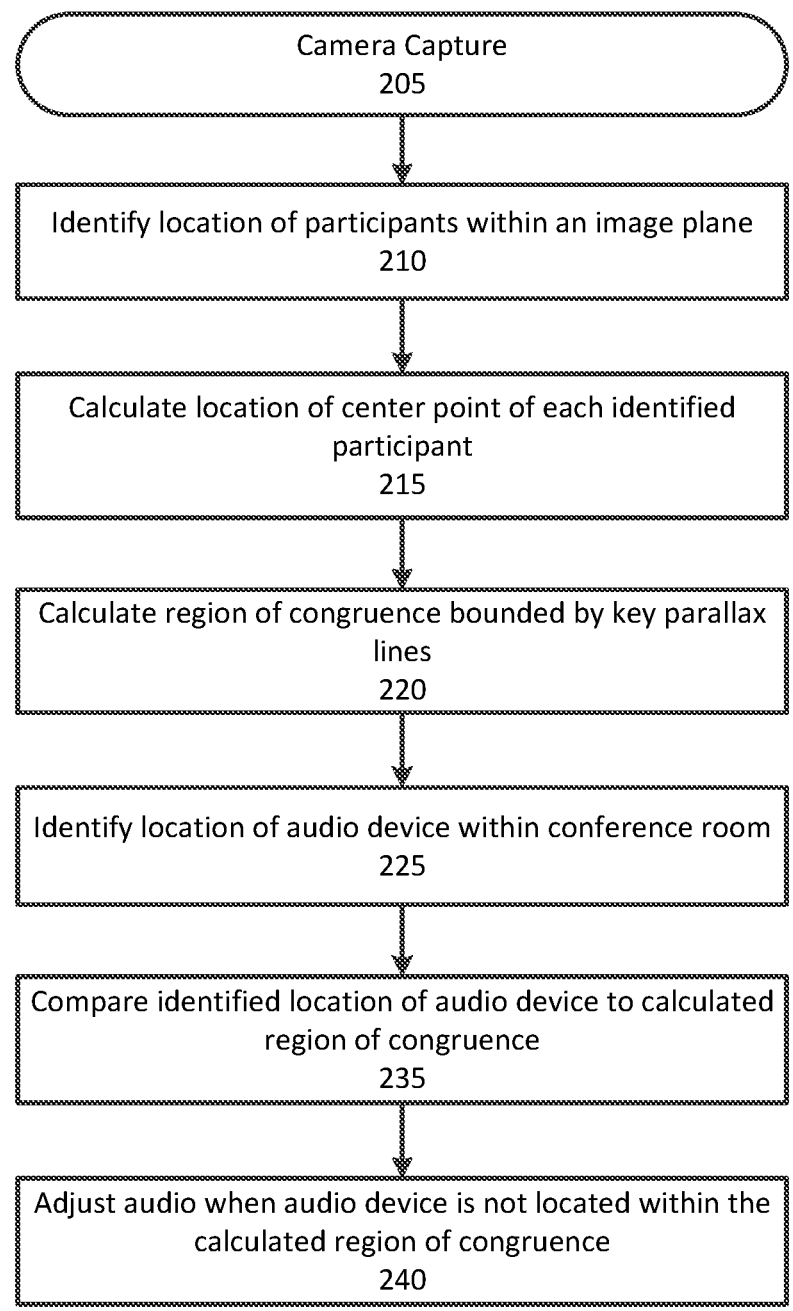
FIG. 2 shows a flow diagram of a method of for detecting and remedying potential incongruence in a video conference, in an embodiment.

This approach represents one technique for determining the potential or existence of incongruence. However, as shown in FIGS. 1A-B, it requires an omniscient view of the room and labeling of participants, which may not be practical in a single-camera video conferencing system. Accordingly, a single-camera solution would be preferable. FIG. 2 shows a flow diagram for a method 200 of detecting and remedying potential incongruence in a video conference, in an embodiment. Using the examples from the FIGS. 1A-B, method 200 may identify potential incongruence by segmenting an image captured by the camera, and determine the acceptable areas for the placement of the audio device in the conference room. The process involves drawing the lines of parallax or aligned objects in the horizontal image plane towards the camera view point. This may create a cell around the camera position, also referred to herein as a region of congruence, which represents a range of placements of the audio device in which no parallax inversion of the participants occurs. By geometric construction, this provides locations for the camera that are outside of the convex hull of the participants, which is a safer option for avoiding incongruence.

A camera of the video conferencing system (such as camera 105) may capture video images of a conference room at step 205. A processor of the video conferencing system may identify locations of each of a plurality of participants within the image plane of a video image of the captured video images at step 210. Using face and shape detection, a location of a center point of each identified participant's torso may be calculated at step 215. Any suitable facial detection algorithm may be used.

In the video conferencing setting, it is reasonable to expect that a camera to be located in a place that participants are likely to look, or generally facing towards. Therefore, it may generally be sufficient to consider a class of algorithms for frontal face detection in the image, such as the Viola-Jones algorithm and the Kanade-Lucas-Tomasi algorithm, for example. Such algorithms can provide a sense of direction and distance (size scale) of a face. Using the identified directions and distances for each face, the system may turn map estimated locations of people associated with the identified faces in the horizontal capture plane of the audio device.

Once the locations of the people have been identified, the location of the center point of each person's torso may be identified, based on, for example, an assumption that it is reasonable to expect that people will present within a predetermined range of vertical distance from an identified face (e.g., from a zero offset that is level with the audio device plane to one meter or less above the audio device plane). Using this general assumption, the system may reasonably estimate the location of a person using the high-confidence returns from a face-finding algorithm, and the using the general scale of the human head. For example, a face and/or face-like object may be identified, and a height of the face h may be estimated. Based on the height h, a center location of the identified face may be located, and a line may be dropped a distance 2*h in the image plane. The location 2*h away from the center location of the identified face may be inferred to be the center point of the person in the horizontal audio device plane. This algorithm may be effective for both the case where the person is sitting and where the person is standing in some embodiments. Since the location is based on captured video, the locations of the participants and the center points may be identified by a device at the capture side of a video conference, or on the receiving side in various embodiments. Additionally, further image classification can be used to determine if a person is seated at a table, or standing, and therefore use more appropriately a value of around 1*h for seated and 2-3*h for standing. While this determination may be based on some assumptions (e.g., that people sit or stand vertically, and that the table and seat height are typical) that may not always be accurate, such an algorithm may cover a majority of use cases, and small errors may not be significant in the end conclusion of congruence regions.

Figure 3A:
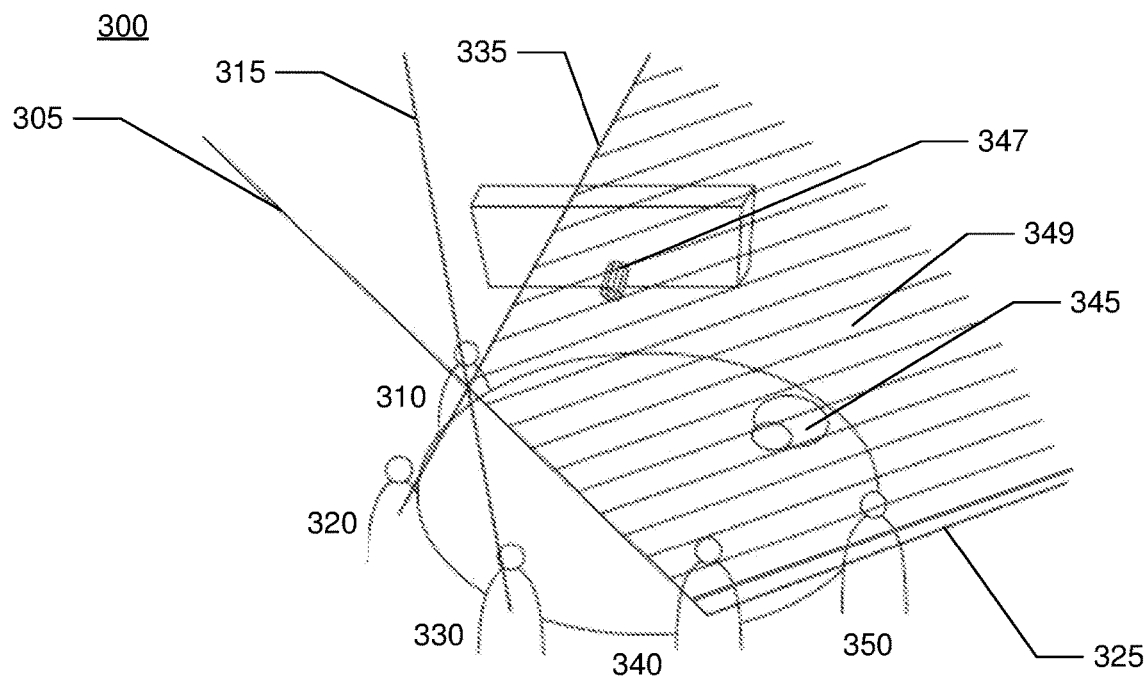
FIGS. 3A-B show schematic plan views of a video conferencing system in a conference room illustrating examples of parallax lines and regions of congruence, in various embodiments
Figure 3B:
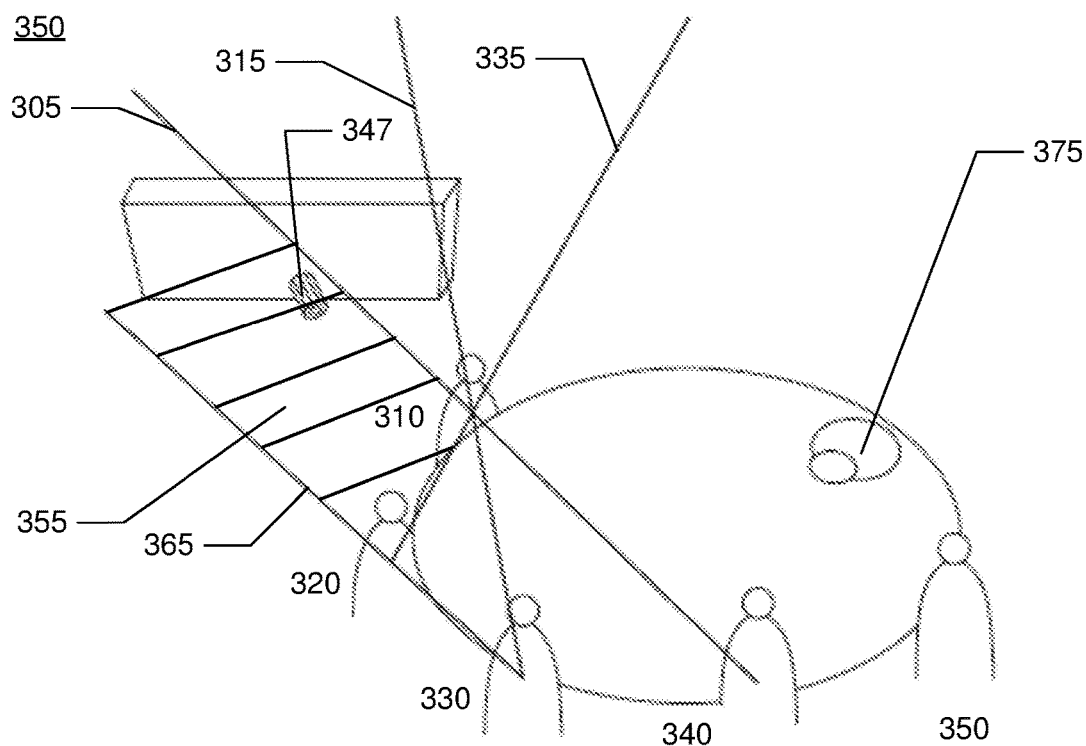

A region of congruence, bounded by key parallax lines and a virtual camera position, may be calculated at step 220, the key parallax lines being a subset of all parallax lines running through the center points of each identified participant. FIGS. 3A-B show schematic plan views respectively of a video conferencing system in conference rooms 300 and 350 illustrating examples of parallax lines and regions of congruence, in various embodiments. In conference room 300, all parallax lines 305, 315, 325, and 335 between the participants 310, 320, 330, 340, and 350 are shown. In FIG. 3A, the region of congruence 349 is shown, and is bounded by key parallax lines 335, 305, and 325, which are the key parallax lines. Parallax line 315, running between participants 310 and 330, is not a key parallax line in conference room 300 because the camera 347 is not located in a cell bounded by parallax line 315. Since the audio device 345 is in the same dividing cell as the camera 347 (the region of congruence 349), conference room 300 may provide mapping congruence. By contrast, conference room 350 has a region of congruence 355 bounded by key parallax lines 305, 335, and 365, due to the different placement of camera 347 (the other parallax lines are not shown). Since the audio device 375 is not located in the same dividing cell as the camera 347 in conference room 350, mapping congruence may not be provided.

Figure 4A:
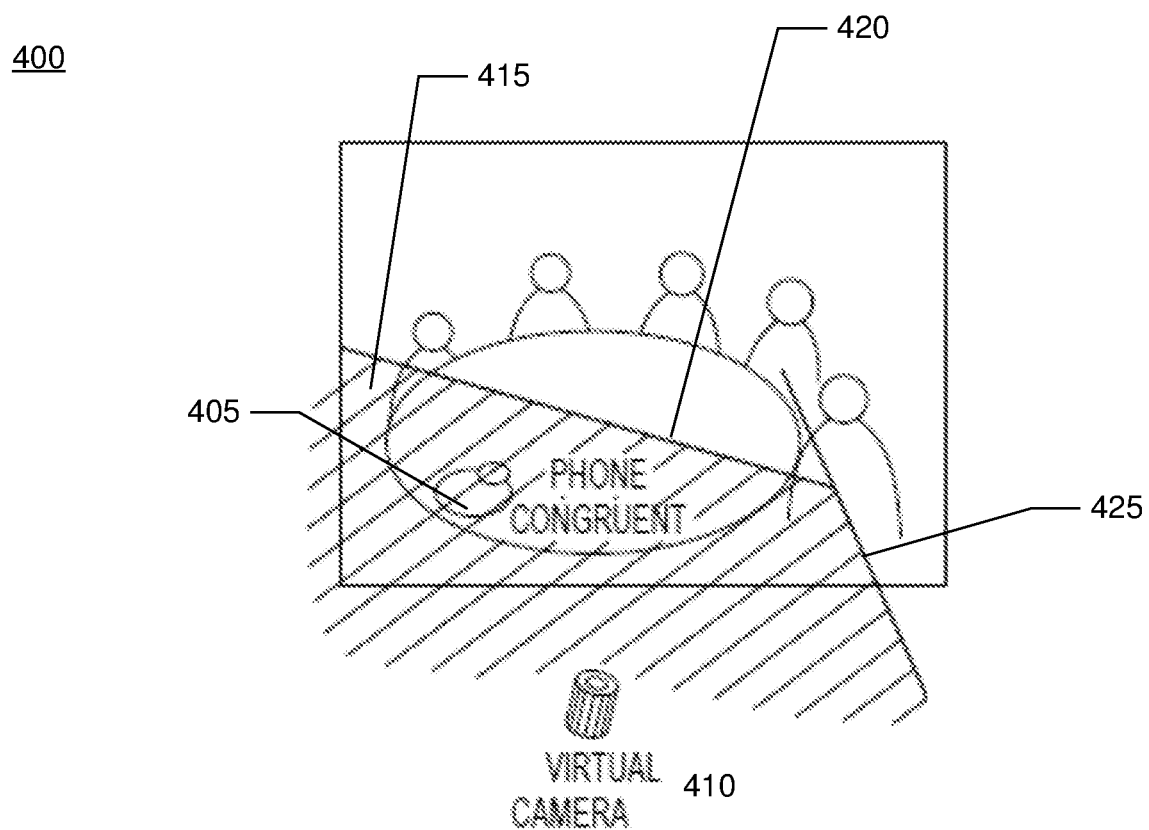
FIGS. 4A-B show schematic plan views of a video conferencing system in a conference room illustrating examples of equipment arrangements within the conference room, and effects on potential incongruence, in various embodiments.
Figure 4B:
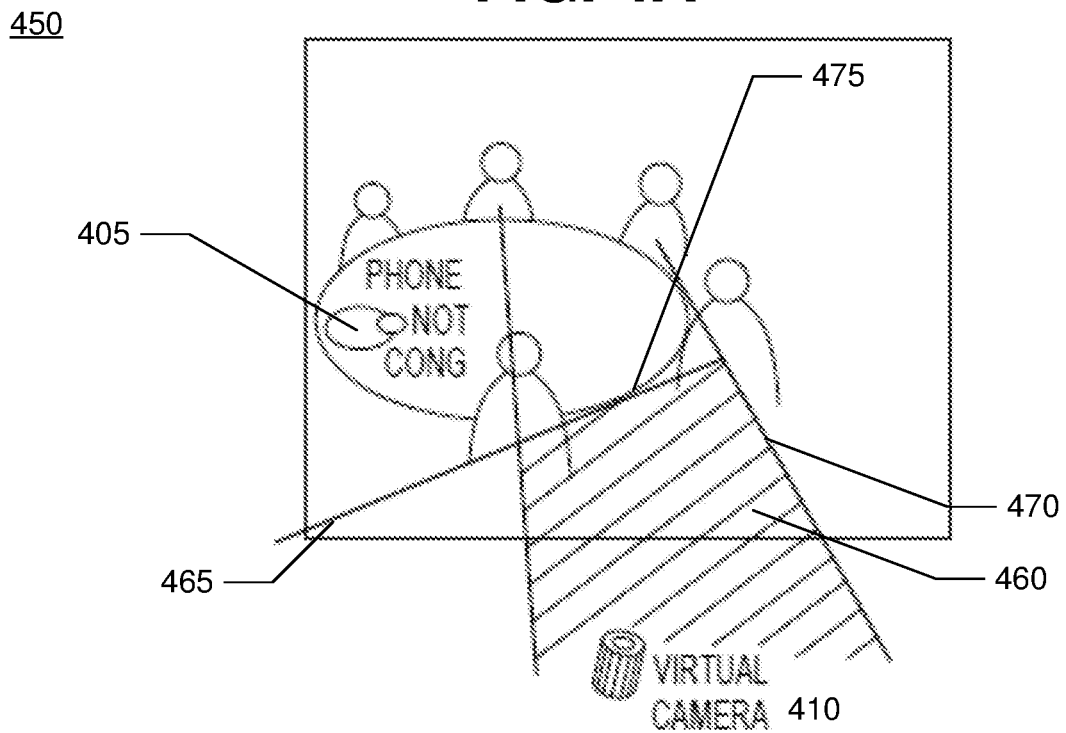

FIGS. 4A-B show schematic plan views 400 and 450 of a video conferencing system in a conference room illustrating examples of equipment arrangements within the conference room, and effects on potential incongruence, in various embodiments. In FIGS. 4A-4B, only the key parallax lines, a subset of all parallax lines drawn used to define the region of congruence, are shown in the extended image plane. Note that the shown parallax lines are constructed as if on the horizontal plane of the table and audio device. In this image plane, the virtual camera point of view is below the actual image frame. FIGS. 4A-B illustrate that the congruence problem is equivalent to ensuring the phone is seen in the shaded region of congruence made by the parallax lines. Stated differently, parallax lines that intersect a line between the camera and the audio capture device may be crossed when translating between the audio and video points of view may cause problems with inversion, leading to incongruence. In the region of congruence, no inversion of object order in the horizontal frame between the audio and video takes place.

In conference room 400, the region of congruence 415 is bounded by key parallax lines 420 and 425. Since the audio device 405 (a phone, in the embodiments shown in FIGS. 4A-4B) is in the region of congruence 415, audio-video congruence is preserved in playback. Likewise, the region of congruence 460 is shown in conference room 450, bounded by key parallax lines 465, 470 and 475. Since the audio device 405 is outside the region of congruence 460, potential audio-video incongruence may occur in playback.

While regions of congruence bounded by key parallax lines between participants are shown in FIGS. 4A-B, other suitable ways may be used to test for congruence. For example, for each participant in a conference room, a triangular region formed by the participant, the camera and the microphone may be determined. If, for each participant, the triangle made by that source, the camera and the microphone contains no other participants, then the capture will not have any inversions between audio and video, and congruence will exist. In addition to the foregoing, other similarly suitable tests may be used to establish that there is congruence, or determine that some sort of remedying must be applied.

It may be assumed that the camera has some elevation above the table, and therefore a non-degenerate mapping of the table plane in which the audio device is present, which allows parallax lines to be drawn on the captured video image itself. As stated previously, the parallax lines are drawn relative to the center points of the chests of the participants, such that they represent a line in the horizontal plane of the audio device. Since the screen will also be positioned above the table plane (a safe assumption) the position of camera projected onto the table plane will be below the visual image plane to obtain the virtual camera position, also used to define the region of congruence. As seen in conference rooms 400 and 450, the geometry of the image plane may be extended to include objects that are off camera, provided that we know their relative orientation to the camera. For example, in conference room 450, the audio device 405 is almost out of the frame of view of the camera 410.

While a non-degenerate mapping is assumed in the above discussion, a degenerate mapping, wherein the camera is in the horizontal plane of the audio device, may also be used instead. It is generally preferable to use non-degenerate mapping by elevating the camera, which allows parallax lines to be drawn on the captured video image. When the camera is suitably elevated over the horizontal plane that includes the audio device, the image plane provides two dimensions (e.g., two of azimuth, elevation and/or scale/distance in the camera), and the third may be estimated based on the received two dimensions (by essentially assuming the relative height of a person's head to the table is constrained), allowing the locations of the camera and the participants to be resolved.

When there is insufficient elevation of the camera (i.e., degenerate mapping is used), it may not be possible to accurately resolve relative distances of objects at the audio device height. If degenerate mapping is used, only one dimension may be resolved from the captured image (angle/azimuth), and a second dimension (one of object range/size or depth/occlusion) may be inferred based on aspects of object size and/or temporary occlusions (i.e., when one object is in front of another). Based on sensory input from the camera, microphone and other devices, a virtual map may be formed of the room, into the location of the camera(s), microphone(s) and sound creating objects as identified may be inferred. In this map, parallax lines can be drawn, and the conditions of congruence determined as being met or violated based on the number of parallax lines crossed between the camera and microphone location. In one embodiment, based on the received angle (from the captured image), an imaginary plane may be created upon which the parallax lines may be drawn between identified participants, and the regions of congruence/incongruence may be identified. The imaginary plane may be used to construct a virtual view of the capture plane (e.g., a top-down view of the conference room) using the captured video and audio data. After the second dimension is inferred, the assumption from the non-degenerate case, that the height of a head is constrained, may be used to estimate the third dimension. If the same methodology were applied to a non-degenerate mapping case (i.e., where the camera is elevated above the horizontal plane including the audio device), then the image plane would simply be used as the imaginary plane, as any area in the horizontal capture plane has non-zero area within the image plane. This simplification cannot be applied to the degenerate case, where every area in the horizontal plane has zero area in the image plane (since the camera's image plane coincides with the capture plane). The imaginary plane created above the degenerate case image plane allows for regions to be drawn in the image plane with a non-zero area.

Returning to FIG. 2, to determine if potential incongruence is present, a location of the audio device within the conference room is identified at step 225. Any suitable technique to identify the location of the audio device, such as methods described in the related '188 application, may be used to identify the location of the audio device (e.g. audio tests, video-only tests, etc.). Since such techniques do not necessarily require use of the camera of the video conferencing system for device location, a virtual point off the image plane may perform the same test for congruence.

At step 235, the identified location of the audio device may be compared to the calculated region of congruence, to see if the audio device is located within the calculated region of congruence. A further aspect of the test may, in various embodiments, be determining how many parallax lines are crossed given the shortest path trajectory from the virtual camera position to the audio device. When zero parallax lines are crossed, audio and visual congruence may be provided.

As described above, the test at step 235 is based on using a geometric model that includes both the estimated positions of the camera and audio device. Many different ways may be used to estimate the positions of the camera and audio device, including using audio location testing and/or simply noting the location from the video image. After locating the devices and drawing the parallax lines, the test determines if the camera and the audio device are in the same parallax cell region (i.e., if any parallax lines are between the camera and the audio device). The test may be a binary determination of whether or not there is a geometric arrangement that permits two or more sound sources to have an inversion in the relative lateral placement in the video and audio streams (e.g., if any parallax lines are crossed) in some embodiments. Alternatively, in some embodiments a continuous measure of potential incongruence may be used, which may take into account additional factors. These factors may include, for example, an extent to which a particular sound source is active or dominant in the audio captured, and an extent to which the pair of sources are significantly separated by distance. The continuous measure may be expressed, for example, as:

$$ICM = \Sigma_{\{all\ problematic\ pairs\}} P(i)*P(j)*d(i,j).$$

Incongruence measure ICM may be a monotonic function where the factors are the probability of each sound source (or participant) being active, and the distance between the two sources for each pair of sources that has a parallax line extension crossing the line between the camera and microphone.

The previous discussion and examples describe an audio device having a single-sided arc of detection. This is generally the case for two channel devices, which may have an axis of symmetry causing problems often known as front-back confusion. In some embodiments, a higher-order microphone array may be used for audio capture that is capable of mapping audio from any angle, and that captured audio can be split and warped into a single line across the screen. Such a mapping of audio across any suitable axis (rather than just parallax lines) allows for an extension of the region of congruence.

Figure 5A:
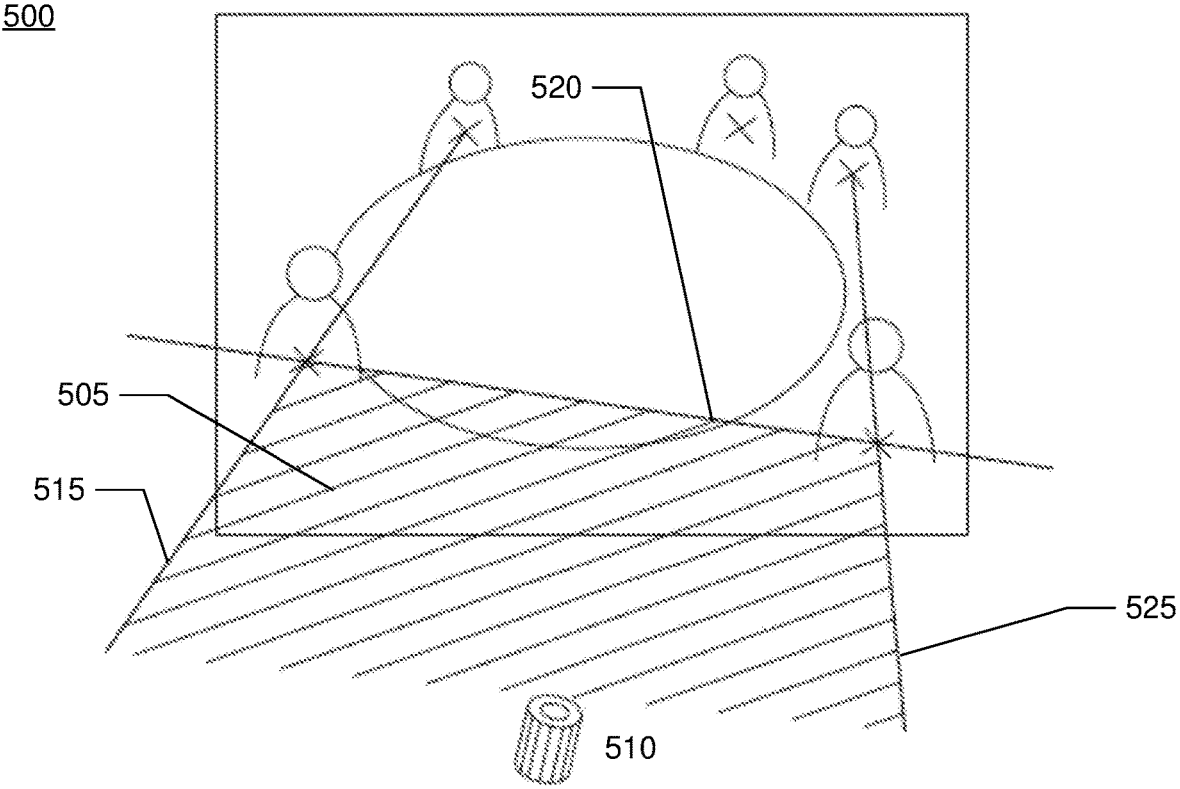
FIGS. 5A-B show schematic plan views of a video conferencing system in a conference room illustrating examples of equipment arrangements within the conference room, and regions of congruence, in various embodiments.
Figure 5B:
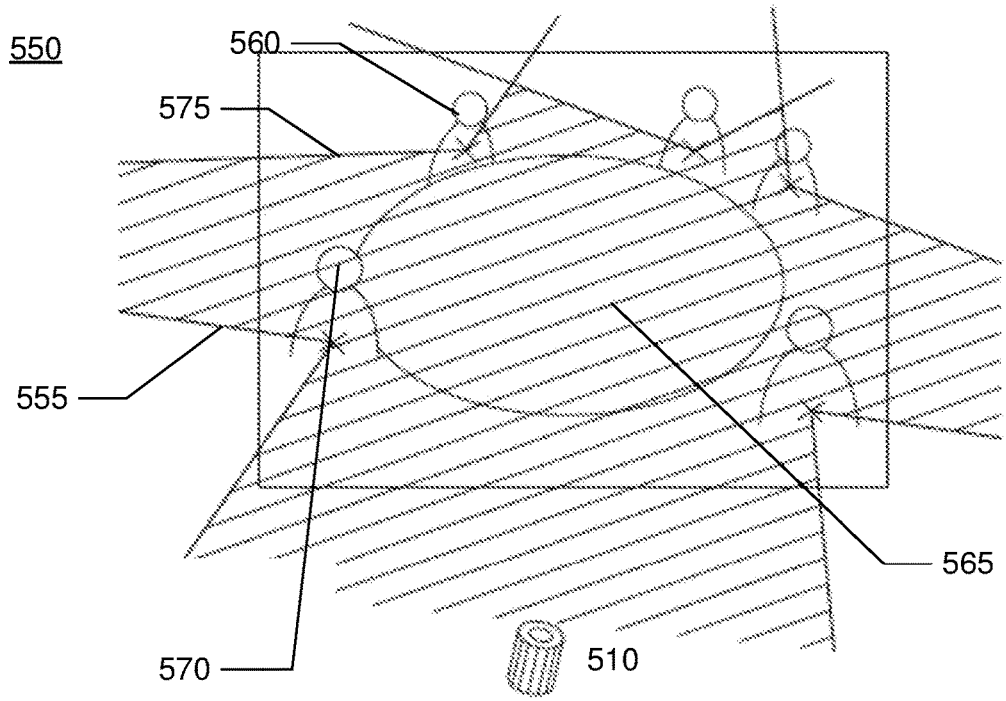

FIGS. 5A-B show schematic plan views 500 and 550 of a video conferencing system in a conference room illustrating examples of equipment arrangements within the conference room, and regions of congruence, in various embodiments. FIG. 5A shows a view of a conference room layout with a region of congruence 505, bounded by key parallax lines 515, 520, and 525, determined for two-channel audio device, as described above. FIG. 5B, by contrast, shows a view of the same conference room layout with a region of congruence 565 for and audio device with a higher-order microphone array. As shown in view 550, the above approach remains applicable with the extension of removing the line segments between any two participants, since the full circle array is not subject to parallax ambiguity with source at 180 degree separation. That is, for a higher-order microphone array, the key parallax lines include only portions of each parallax line 555 and 575 extending beyond a pair of identified participants 570 and 560, for example. This creates a much larger allowable congruence region, covering the entire area of the conference table. In all positions of the shaded congruence region 565, the audio device can be positioned such that the participants are ordered in spatial audio angle in monotonic angle based on the horizontal order that they appear on the screen. The incongruence ambiguity may only occur with parallax at 0 degree separation, which corresponds to line segments extending only beyond the pair of participants. It is noted that a more complex mapping of rotation and splitting of the 360 degree sound field is required to achieve full congruence within the congruence region 565, however. Any suitable mapping technique may be used for higher-order microphone arrays, such as the solutions described in related U.S. Prov. Pat. App. No. 61/798,257 ("the '257 application"), entitled "Full Frontal Headphone Virtualization," filed on Mar. 15, 2013 and hereby incorporated by reference.

In the case of objects having a very different horizontal angles, the approach shown in FIG. 5B provides an extreme limit of the locations for the audio device for which a parallax inversion occurs. It is also noted that the vertical offset of the camera 510 from the horizontal plane considered for congruence may introduce some error.

Figure 6:
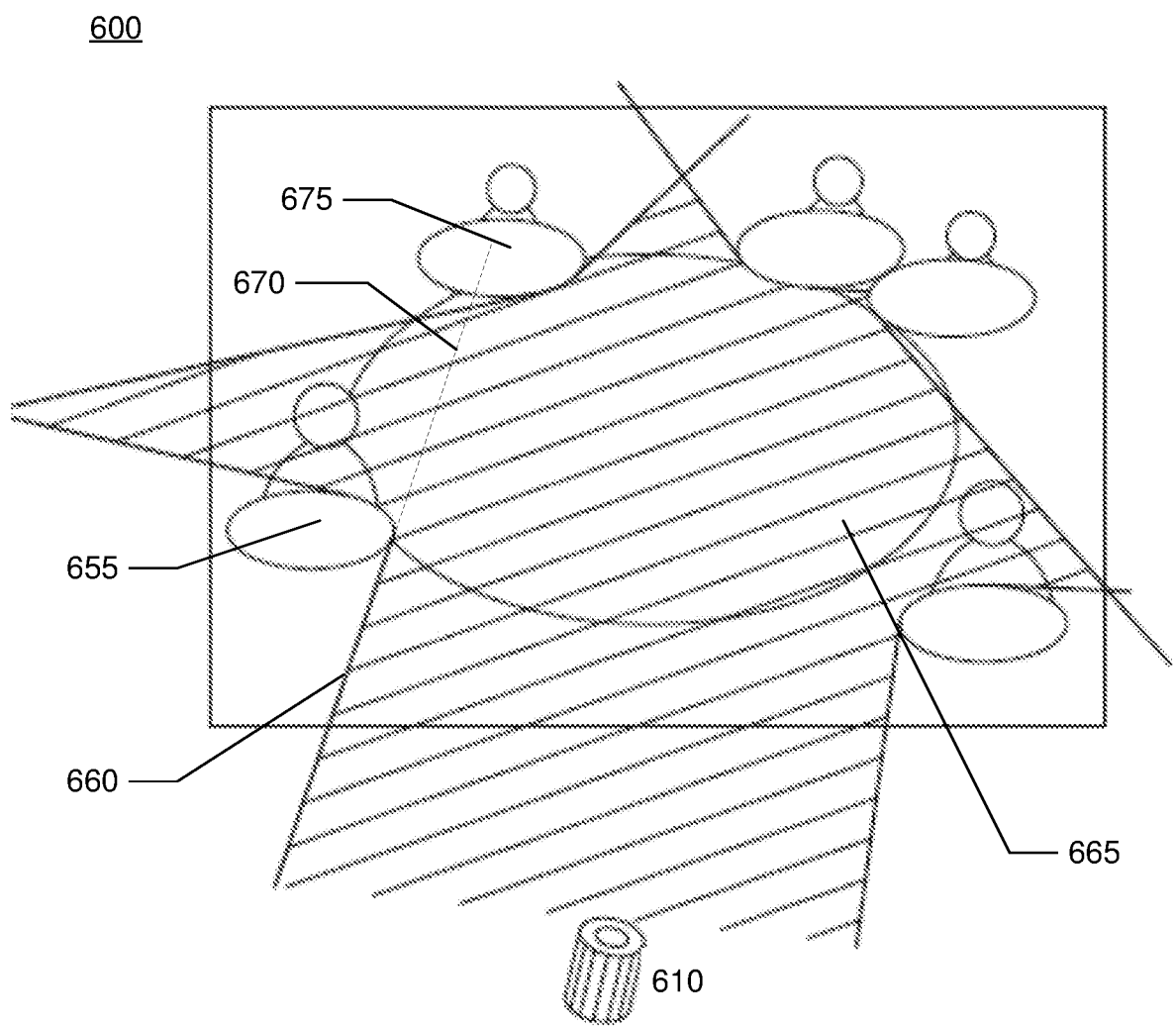
FIG. 6 shows schematic plan views of a video conferencing system in a conference room illustrating examples of equipment arrangements within the conference room and an adjusted region of congruence, in an embodiment.

FIG. 6 shows schematic plan views of a video conferencing system in a conference room 600 illustrating examples of equipment arrangements within the conference room and an adjusted region of congruence, in an embodiment. For each participant point in the scene, a circular region is considered in the capture horizontal plane (e.g., the plane including the audio device). The circular region may for each participant may be represented as an ellipse in the image plane of the camera 610 (due to the perspective), as shown in FIG. 6. Ellipses may be used to represent participants when defining regions and mappings for determining congruence to correct for potential errors introduced from the estimations and assumptions of the listener position in the horizontal audio plane compared to the listener's visual location in the video plane. It is also noted that the ellipsoids of uncertainty may additionally soften and generalize the constraints. As such the exact scale and nature of the generalizations are not critical, and may be made within reason to approximate the error and reasonable movement and uncertainty in the exact participant locations in the perceived image and audio space. Some situations of congruence are more problematic than others, and the geometrical construct is, in particular, used to identify particularly problematic conditions that arise from two sources that are somewhat distant in the real-world space, but are potentially inverted in the image and audio space relative to other objects. This may occur when there are a pair objects of a significantly different depth or azimuth in the image plane, that also lead to the construction of a parallax line extension intersects a line from the identified camera location (approximated by the midpoint of the bottom of the image, or an extension of the midpoint in the image plane just below the field of view) and the position of the microphone device in the image plane. Conversely, sources whose ellipsoids overlap (are close together) or are arranged so that no line between the two ellipsoids can intersect the line from virtual camera to microphone position may generally not create any significant (angular ordering inversion) congruence issues.

For the bounding parallax rays, to account for use of ellipses to add robustness, the model may be adjusted such that the ray from each participant center intersects the ellipsoid of the other participants at a tangent. The boundary of a region of congruence is then formed by these lines extending from the ellipsoids away from the starting participant center, and the boundaries of the ellipsoids themselves, rather than merely the parallax lines between the center points of each participant. The degree of tolerance can be adjusted by changing the size of the ellipsoids. The size of the ellipsoids can be adjusted based on a robustness parameter or alternatively on the uncertainty in the visual estimation of participant positions, in various embodiments. Note that as the participants become closer, or the region of uncertainty increases, the allowable region of congruence will decrease.

FIG. 6 illustrates the adjustment of the region of congruence for greater robustness. As shown in FIG. 6, region of congruence 665 is bounded by the line going from the center of ellipse 675 and tangential to ellipse 655. Since a higher-order microphone array is being used, only segment 660 extending past participant ellipse 655 is used to bound the region of congruence 665. Segment 670 of the line is not a boundary of the region of congruence 665 due to use of the higher-order microphone array.

The above-describe approach of determining the allowable placement of the audio device is powerful and it can be seen to match intuition. As more participants are stacked over distance, the congruence region shrinks back to the camera 610 to avoid parallax inversion. The congruence region includes an exclusion around participants. When extended to a 360 degree microphone, and the group presents as an open circle to the camera 610, the congruence region may include the entire table top.

Other methods may be used to determine regions of congruence. For example, an iconic visual cue for participant activity may be detected, such as lip movement. The angle of the visual cue may be registered from the camera point of view. The instantaneous direction of arrival, or averaged direction of arrival over the period of activity of that object, may then be determined. If there is high confidence of the activity being fairly isolated, such as when there is only one region of video and audio activity with high confidence, the pair of angles for the camera 610 and audio device direction of arrival may be noted. Referring to at least two previous segments of detected object activity, the angles may be compared such that when the video angles are stacked from left to right (or right to left) in sequence, the corresponding angles also represent a monotonic set (modulo 360 degrees). Specifically, the third object when placed in the order seen across the camera field of view should not lie at an angle between the first two angles (modulo 360). Cases where there is any ordering relates to the prevalence of parallax swap, and therefore the potential for incongruence.

There may be cases where the situation is uncertain or the likely setup is untenable. This can include the following situations: failure to accurately register a device rotation as in disclosure Spatial Registration of Devices; the image represents a situation that is an unusual or unexpected use case and likely to raise congruence issues; and movement in the device is detected and insufficient time has passed to allow proper registration.

Returning to FIG. 2, when the audio device location is not within the region of congruence, audio captured by the audio device may be adjusted by adapting a captured audio signal to reduce effects of incongruence when the captured audio is replayed at a far end of the video conference at step 240. The primary reason for detecting and mitigating incongruence is to avoid a poor user experience. Given this, it is possible to utilize online user feedback or activity to detect potential issues. Some user behavior that can be noted to represent issues of incongruence in the media include: swapping of headphones to correct for object inversions; frequent rapid and involuntary eye saccades; preference to switching stream back to mono (if available as an option); and direct complaint by a participant.

Where there is an endpoint noted to have a congruence issue, this information may be registered by only a few users and then extended as information to implement the processing for all users observing that stream. This approach is particularly simple and effective at eliminating problematic endpoints that have static configuration.

One option to consider when potential incongruence is detected is the use of a single channel or mono audio signal from the capture (or for rendering that specific stream). Note here that mono may include an aggressive adaptive beam forming solution such that there is enhanced voice clarity in the capture. Since no spatial information is imparted in the audio steam or render based on the location of participants within the video scene, there is no potential for incongruence. This solution is effective, though has the disadvantage of eliminating many of the key benefits of spatial capture.

Figure 7:
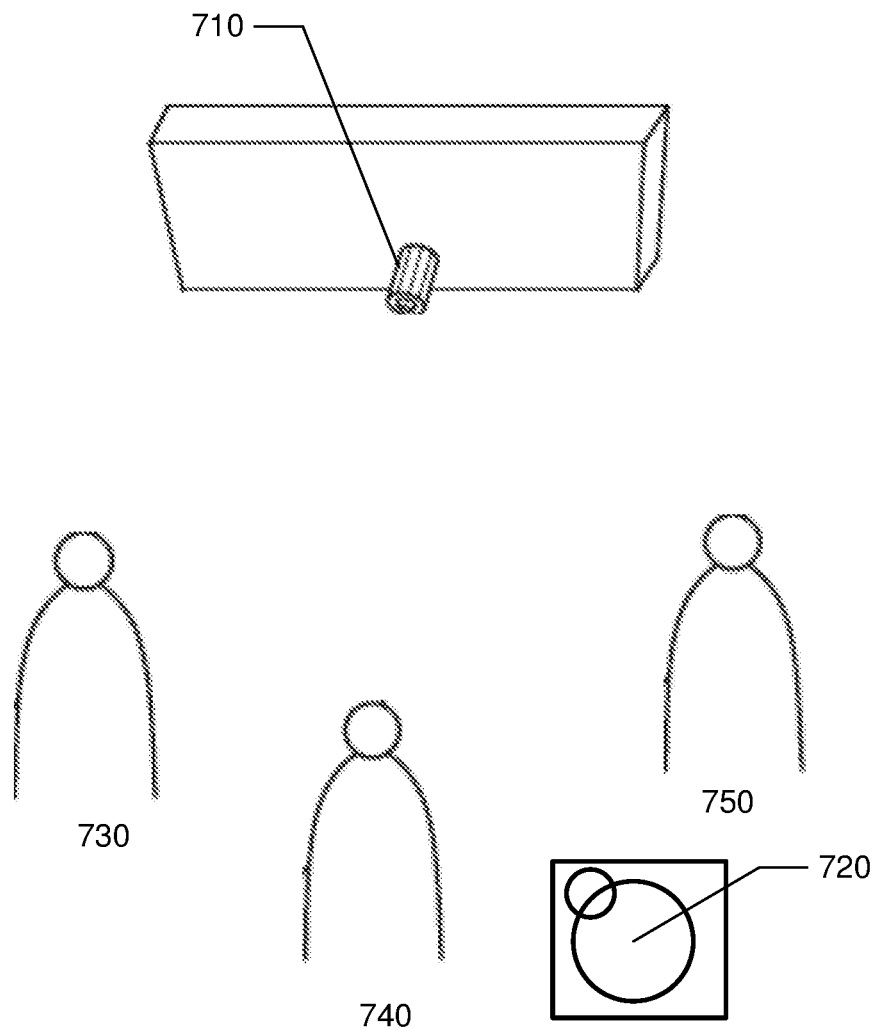
FIG. 7 shows schematic plan views of a video conferencing system in illustrating an exemplary equipment arrangement within a conference room.

FIG. 7 shows a schematic plan view of a video conferencing system in illustrating an exemplary equipment arrangement within a conference room 700. As previously stated, incongruence can become problematic when an audio device 720 is located significantly off-axis to the camera 710. Conference room 700 shows participants 730, 740, and 750 alternating in angle in the field of view of the audio device 720, while being monotonic in angle with respect to the camera 710. The alternation of audio directivity (even though only slight) is in distinct and disturbing contrast to the linear arrangement with respect to video capture. In situations such as the one shown in conference room 700, the detector may decide to revert to single channel (mono) capture and/or playback. While parallax lines are not shown in FIG. 7, the case shown, with the phone 720 to the side, is a good example of where the test of method 200 would lead to the conclusion that between the camera 710 and phone placement there is the potential to invert the relationship of almost every pair of participants, and mono playback may be used for the captured audio to avoid the inversions.

In some cases where there is reverberation or a complex diffuse room acoustic being rendered, the precision of perceptual localization of audio may be lowered. This may increase the tolerance for parallax inversions between the audio and video. Furthermore, if the width of the rendering of the spatial sound field is reduced, this again may increase the relative perceptual tolerance. Therefore, when incongruence is detected, one approach may be to step the width of the spatial render back to an appropriately small angle. In particular, rendering solutions are often adopted that place the image in a frontal cone. Reducing the width of this cone in the horizontal plane reduces the extent to which inverted parallax audio cues are presented alongside the video. For this approach there is still a systematic sense of displacement and relative orientation for audio objects in the captured scene as played back to the end listener. However, since the range of angles is substantially reduced, the distraction of large incongruence is not as great.

An interesting note is that this approach is more effective when both the video and squeezed audio are rendered to one side rather than centered on the screen or audio image. Arguably, there is a greater perceptual significance of objects crossing a participant's natural forward-facing centre line, and avoiding any inversion or audio visual congruence across this centre line is useful to mitigate the impact of expected or unknown incongruence.

A particular case of interest is where the audio is rendered over speakers to accompany the video. In its simplest form, we consider the location of objects in the original audio scene to correspond somewhat to panning across the speaker array used in the reproduction. Efforts are usually made to ensure the relative width of the audio scene, speakers and video are matched—a secondary form of scaling congruence. For video content that has spatial audio that would be incongruence, we consider the idea of using a diffuse reconstructed field by the use of a network of de-correlating filters. By ensuring that sound from any direction come out of all speakers with relatively equivalent power levels, we can utilize the phase control at the render to impart spatial diversity without definitive spatial cues Consider the case of a spatial microphone capturing in the meeting room from the previous figure. Such a sound-field can be decoded to a set of speakers in a way that retains or re-creates much of the spatial cues present in the meeting room. As will be seen, the proposed approach here is by construction fairly insensitive to the decoding approach used. Therefore for at least one embodiment the principle of capture and decoding may be based upon Higher Order Ambisonics or Spherical Harmonic representation, either 2 or 3 dimensional. See, e.g., https://www.researchgate.net/publication/317036443_Surround_by_Sound_A_Review_of_Spatial_Audio_Recording_and_Reproduction.

Figure 8:
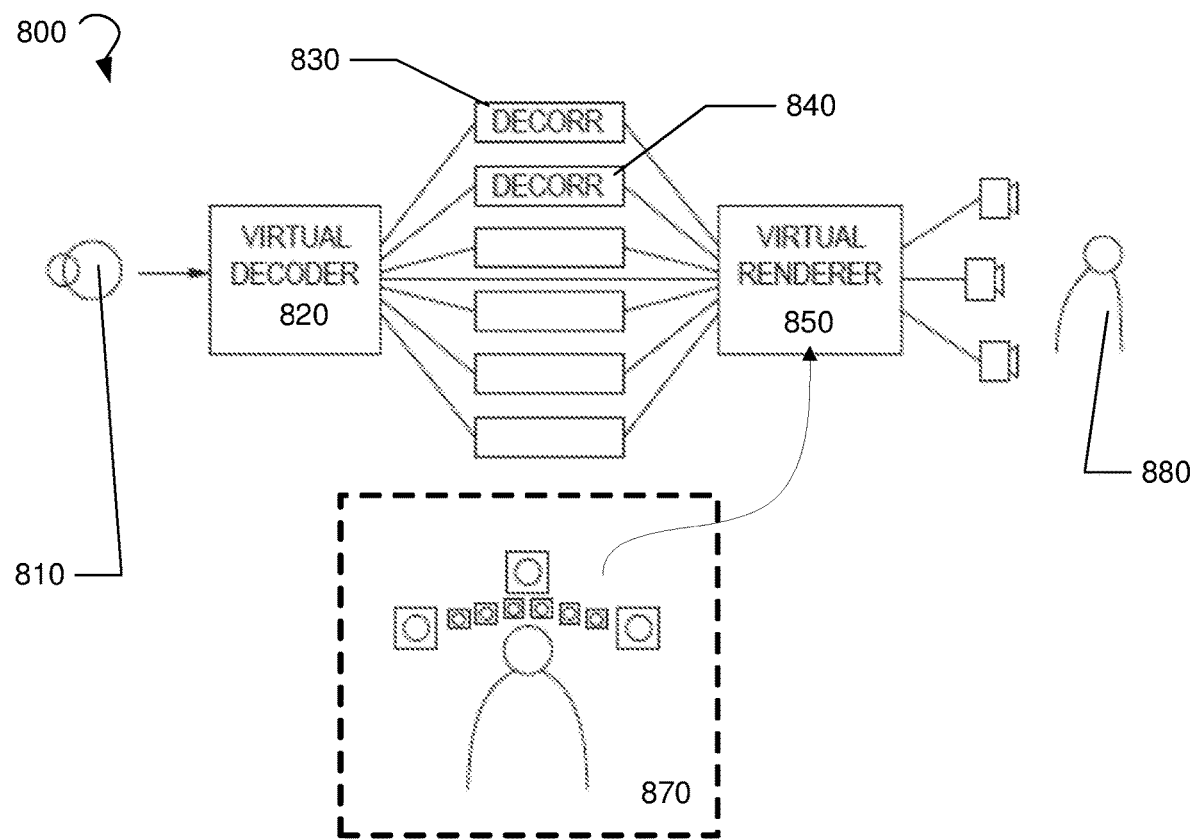
FIG. 8 is a block diagram of an exemplary system for generating and providing decorrelated audio, in an embodiment.

An additional step is now included which involves adding some additional spatial and temporal diversity through the use of decorrelators on each of the virtual speaker feeds. FIG. 8 is a block diagram of an exemplary system 800 for generating and providing decorrelated audio, in an embodiment. As shown in system 800, the audio stream captured by microphone 810 may be decoded by virtual decoder 820 and passed through decorrelators 830 and 840. Generally, a small range of angles for the virtual sources may be utilized to create a cohesive central image. Spatial diversity is preserved with the specific directional spatial cues largely removed. The decorrelators and decode are designed such that there is minimal combing in the composite filters, and the timbre is preserved reasonably well. Embodiments and details of such decorrelators 830 and 840 will be given in a subsequent section. The general definition of the decorrelator is that each speaker is modified with a distributed phase and frequency response that effectively spreads the signal over time as would have occurred in the room due to the different timing of reflections when rendered by virtual renderer 850. Box 870 illustrates the effect of the virtual speakers being decorrelated, such that the signal from each virtual speaker is spread over time before being presented to far-end participant 880.

It is noted that in the case of a linear set of operations (decoder, decorrelator and renderer) the filters can be convolved to create a minimal set of filters related to the input and output channel count. The approach shown in system 800 leads to a process for design of such filter, and also allows generalizations where the three operations shown (decode, decorrelate, render) may be non-linear or time varying and therefore cannot be simply convolved into a single linear system.

Figure 9:
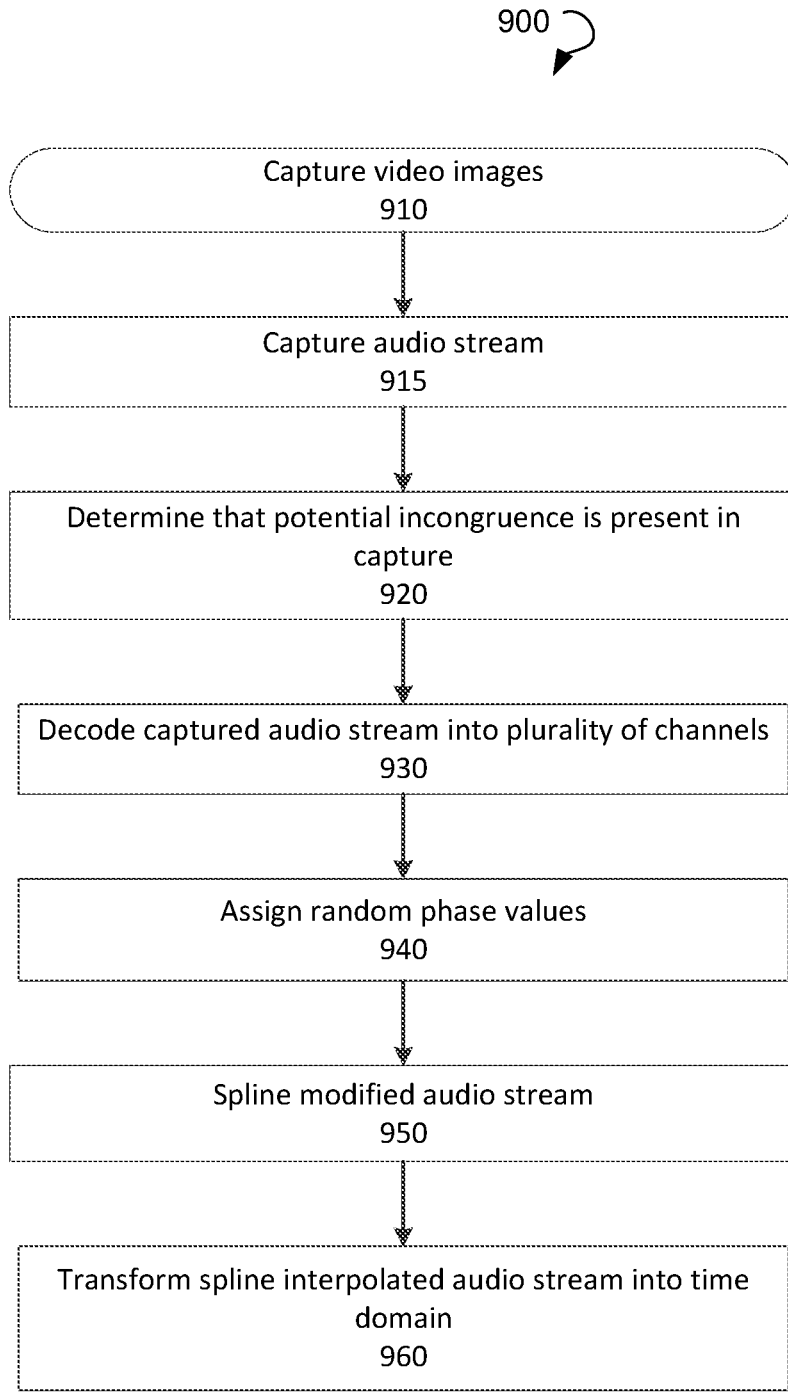
FIG. 9 shows a flow diagram for an exemplary method for providing decorrelated audio in response to determining that incongruence may be present in far end playback of a video conference, in an embodiment.

FIG. 9 shows a flow diagram for an exemplary method 900 for providing decorrelated audio in response to determining that incongruence may be present in far end playback of a video conference, in an embodiment. At step 910, video images are captured, and at step 915 an audio stream is captured from a conference room, as described above. The presence of potential incongruence in far end play back of the captured video images together with playback of the audio stream may be determined at step 920. The potential incongruence may be determined based on a location of the audio device within the conference room, as described above. The captured audio stream may be filtered in response to the determining that potential incongruence is present. Consider a filter designed to have a relatively constant magnitude response, and a phase response that varies around the group delay offset in a way that is band limited on a perceptually spaced frequency scale. Rather than get fixated on which perceptual scale (Mel or Bark), at this point we shall consider a logarithmic frequency scale with a bounded frequency range say from 100 Hz to 10 kHz The filtering may include decoding the captured audio stream into a plurality of channels, the plurality of channels having a structured spatial relationship, at step 930. Random phase values that are band-limited may be assigned to each of the plurality of channels to modify the captured audio stream at step 940. The modified audio stream may be spline interpolated at step 950. The spline interpolated audio stream may be transformed into the time domain to provide a decorrelated audio stream corresponding to the captured audio stream at step 960. Table 1 below shows an example of a specific filter design that implements steps 930-960.

TABLE 1

Exemplary Pseudocode for a filter implementing decorrelated audio in response to detected potential incongruence

```
Shift = pi/2;     Bands = 25;   F0 = 100;              Fs = 48000;
Fb = 100*10.^(log10(Fs/2/F0)*(-10:Bands-1)/(Bands-1));  % Create logarithmic
bands
A = ([ zeros(10,2); Shift*randn(Bands,2)]);             % Random phase
values
OS = ceil(2*max(diff(Fb)));
A = [[0 0]; resample(A,OS,1)];                          % Resample
Fb = [0; 100*10.^(log10(Fs/2/F0)*(-10:1/OS:Bands-1/OS)'/(Bands-1))];
F = (0:6:Fs/2)';                                        % Linear frequency
As(:,1) = spline(Fb,A(:,1),F);                          % Spline
As(:,2) = spline(Fb,A(:,2),F);
M = (24000-F)./(F+24000);                               % Fade out at Nyquist
H = repmat([M; flipud(M(2:end-1))],1,2).*exp(1i*[As; -flipud( As(2:end-1,:))]);
h = ifftshift(ifft(H));                                 % Calculate impulse
responses
```

The filters may be designed to be fairly short in length. In the exemplary filter of Table 1, the filter is applied for less than 10 ms, which provides sufficient de-correlation for the spatial ambiguity without creating a sense of reverberation or temporal spread.

Given the designed short length, not having causal filters may be sufficient. An extension is presented here that allows for a more causal filter. In addition to the random phase, a phase offset may be introduced that is essentially linear on the log frequency scale. This corresponds to shifting the group delay such that lower frequencies are delayed more making the filter more causal. For example, the skew phase addition may be described in the following equation:

$$A=([zeros(10,2);Shift*randn(Bands,2)])-Skew*((0:Bands+9)'/(Bands+9)*[1\ 1]).$$

Other approaches may be used to provide decorrelated audio in response to detecting potential incongruence. In the previous section, an approach was presented that created a set of decorrelated virtual sources and utilized this to construct the render presented to the listener. This process can be carried out in a similar fashion with the final rendering being a binaural renderer. This has the advantage of allowing flexible placement of the sources. In essence, we use a binaural virtualizer to render the virtual sources from the virtual decoder. Lots of nice decorrelation and filtering that is at once spatially plausible and very convoluted in terms of creating a sense of ambiguity in the spatial cues. Also, it is possible to go directly to synthetic binaural filters from the decorrelation approach presented in the previous section.

Since these filters have constant unity magnitude, they represent a filter from a source that has constant inter-aural intensity cues. However the phase or time arrival across the response is dithered. If this is carried out with a sufficient number of bands (e.g. 20-40) the perceived result is of a fairly spread but ambiguous sound source in the forward central direction. For shorter filters (fewer decorellation bands), minor biases in the responses can create a sense of left or right placement. For longer filters (more decorrelation bands) the audio will start to become reverberant sounding and disturbing.

Figure 10:
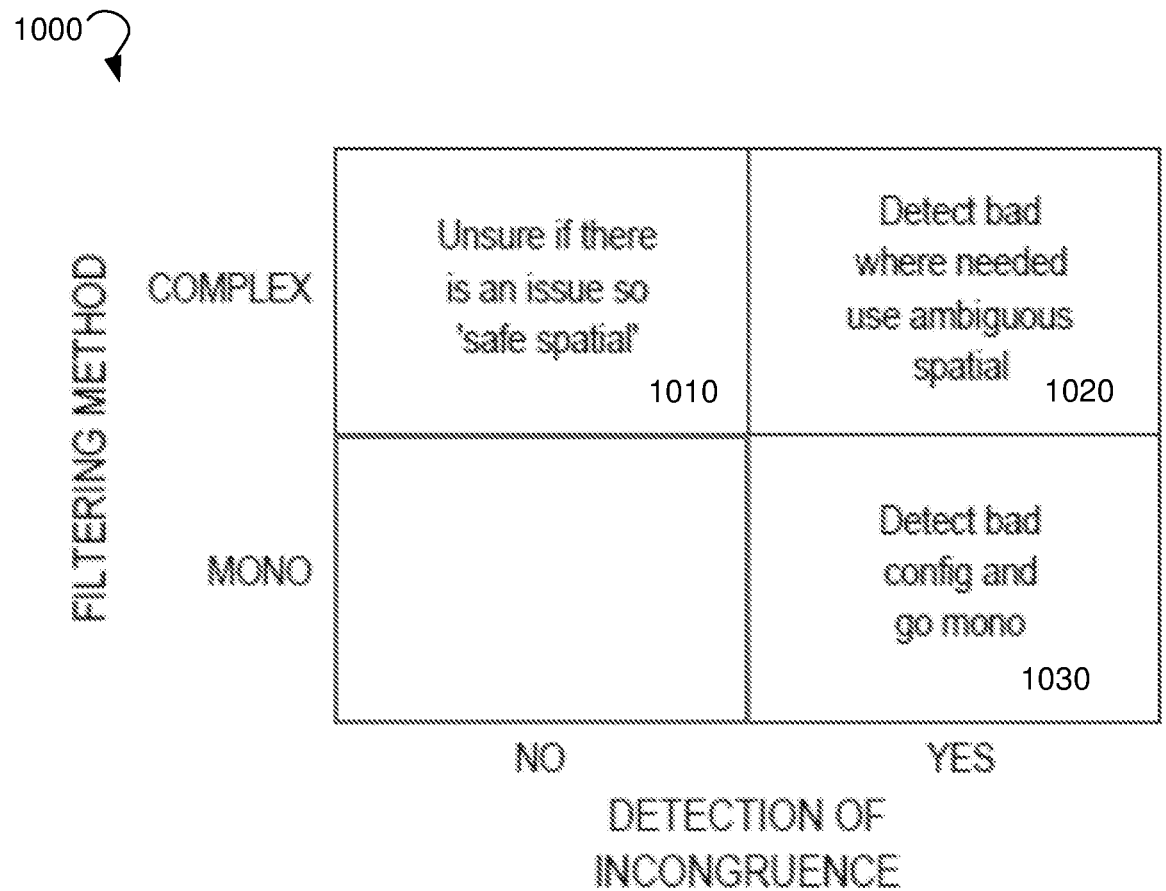
FIG. 10 is a table representing an approach for detecting and remedying potential incongruence in a video conference, in an embodiment.

FIG. 10 is a table 1000 representing an approach for detecting and remedying potential incongruence in a video conference, in an embodiment. Table 1000 provides a potential approach to determining what approach to take for mitigating potential incongruence depending on the capture equipment available.

When a system includes a video input device and a spatial audio input device, and the analysis of the video scene is carried out to consider the lines or parallax between pairs of potential audio sources in a horizontal plane, and where the audio capture device is separated from the projection of the camera location into the same plane by one or more parallax crossings, the spatial audio information may be reduced. This reduction may take the form of going into single-channel, as in case 1030, or using ambiguous spatial audio (e.g., decorrelated audio), as in case 1020. When no potential incongruence is detected, and insufficient data is available to confirm that no incongruence is present, safe spatial audio may be used (e.g., the pinched audio described above), as in case 1010.

Figure 11:
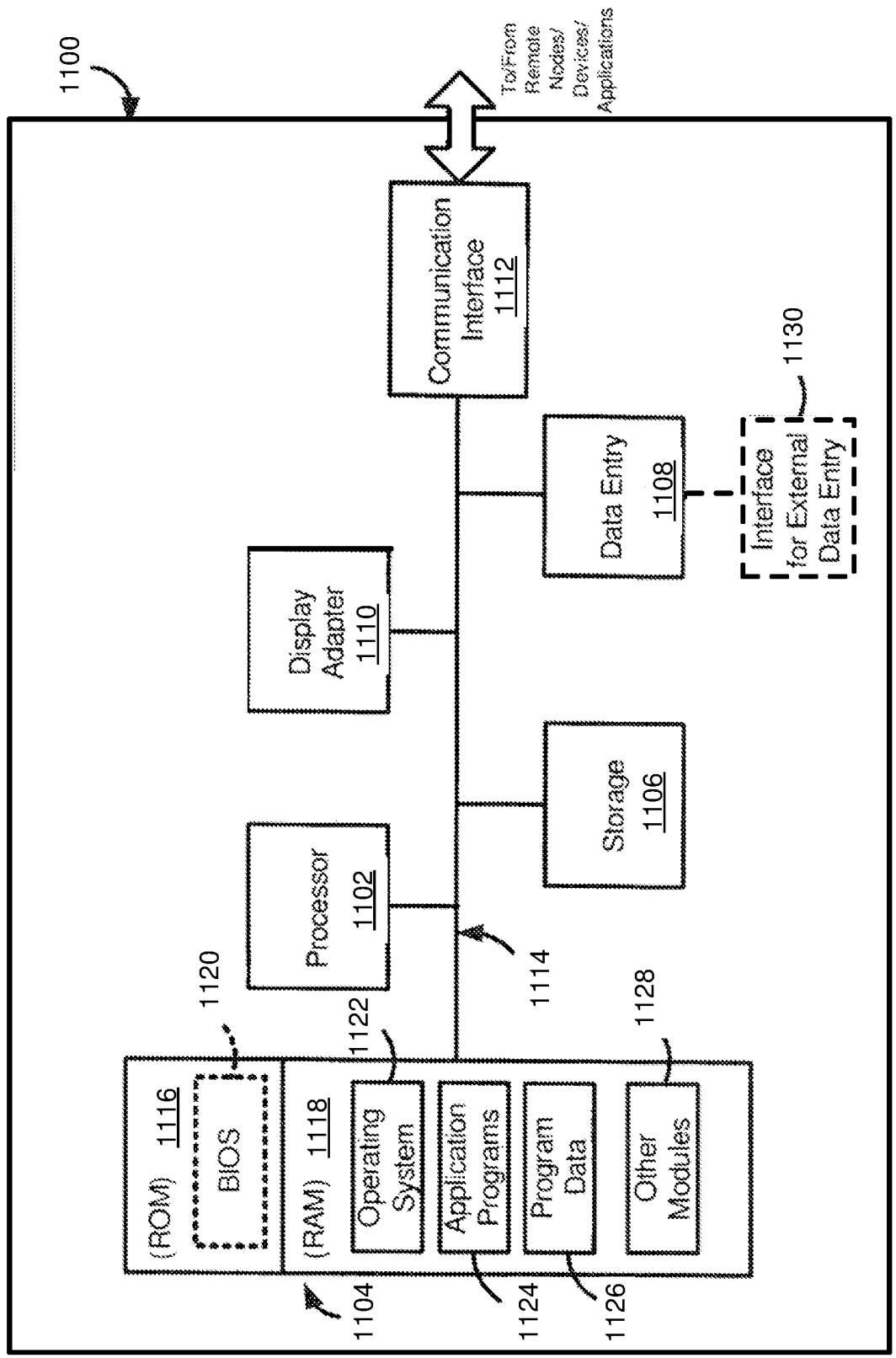
FIG. 11 is a block diagram of an exemplary system for modifying far-end signal playback on an audio device, in an embodiment.

FIG. 11 is a block diagram of an exemplary system for modifying far-end signal playback on an audio device, in various embodiments. With reference to FIG. 11, an example system for implementing the subject matter disclosed herein, including the methods described above, includes a hardware device 1100, including a processing unit 1102, memory 1104, storage 1106, data entry module 1108, display adapter 1110, communication interface 1112, and a bus 1114 that couples elements 1104-1112 to the processing unit 1102.

The bus 1114 may comprise any type of bus architecture. Examples include a memory bus, a peripheral bus, a local bus, etc. The processing unit 1102 is an instruction execution machine, apparatus, or device and may comprise a microprocessor, a digital signal processor, a graphics processing unit, an application specific integrated circuit (ASIC), a field programmable gate array (FPGA), etc. The processing unit 1102 may be configured to execute program instructions stored in memory 1104 and/or storage 1106 and/or received via data entry module 1108.

The memory 1104 may include read only memory (ROM) 1116 and random access memory (RAM) 1118. Memory 1104 may be configured to store program instructions and data during operation of device 1100. In various embodiments, memory 1104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1104 may also include nonvolatile memory technologies such as nonvolatile flash RAM (NVRAM) or ROM. In some embodiments, it is contemplated that memory 1104 may include a combination of technologies such as the foregoing, as well as other technologies not specifically mentioned. When the subject matter is implemented in a computer system, a basic input/output system (BIOS) 1120, containing the basic routines that help to transfer information between elements within the computer system, such as during start-up, is stored in ROM 1116.

The storage 1106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1100.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1106, ROM 1116 or RAM 1118, including an operating system 1122, one or more applications programs 1124, program data 1126, and other program modules 1128. A user may enter commands and information into the hardware device 1100 through data entry module 1108. Data entry module 1108 may include mechanisms such as a keyboard, a touch screen, a pointing device, etc. Other external input devices (not shown) are connected to the hardware device 1100 via external data entry interface 1130. By way of example and not limitation, external input devices may include a microphone, joystick, game pad, satellite dish, scanner, or the like. In some embodiments, external input devices may include video or audio input devices such as a video camera, a still camera, etc. Data entry module 1108 may be configured to receive input from one or more users of device 1100 and to deliver such input to processing unit 1102 and/or memory 1104 via bus 1114.

The hardware device 1100 may operate in a networked environment using logical connections to one or more remote nodes (not shown) via communication interface 1112. The remote node may be another computer, a server, a router, a peer device or other common network node, and typically includes many or all of the elements described above relative to the hardware device 1100. The communication interface 1112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1112 may include logic configured to support direct memory access (DMA) transfers between memory 1104 and other devices.

In a networked environment, program modules depicted relative to the hardware device 1100, or portions thereof, may be stored in a remote storage device, such as, for example, on a server. It will be appreciated that other hardware and/or software to establish a communications link between the hardware device 1100 and other devices may be used.

It should be understood that the arrangement of hardware device 1100 illustrated in FIG. 11 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 11. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Systems and methods are described for detecting and remedying potential incongruence in a video conference. The video conference video capture may be provided by a camera of a video conferencing system and audio capture may be provided by an audio device. A camera of a video conferencing system may capture video images of a conference room. A processor of the video conferencing system may identify locations of each of a plurality of participants within an image plane of a video image of the captured video images. The audio device may be outside of the image plane, in some embodiments. Using face and shape detection, a location of a center point of each identified participant's torso may be calculated. A region of congruence bounded by key parallax lines may be calculated, the key parallax lines being a subset of all parallax lines running through the center points of each identified participant. A location of the audio device within the conference room is identified using an audio test, a video test, and/or some other suitable technology. When the identifying the location of the audio device within the conference room fails, the processor may adjust audio captured by the audio device. The adjusting may include adapting a captured audio signal to reduce effects of incongruence when the captured audio is replayed at a far end of the video conference.

The identified location of the audio device may then be compared to the calculated region of congruence within the conference room. When the audio device location is not within the region of congruence, audio captured by the audio device may be adjusted by adapting a captured audio signal to reduce effects of incongruence when the captured audio is replayed at a far end of the video conference. The adapting may take several forms. For example, the captured audio may be changed from full spatial audio to single-channel audio or to decorrelated audio, or a width of a spatial render associated with the captured audio signal may be reduced.

In an embodiment, the processor may determine a virtual camera position in the image plane by calculating a perpendicular bisector down from the camera to the image plane, wherein the camera is located above the image plane including the audio device, wherein the calculating the region of congruence is further based on the determined virtual camera position, the region of congruence including the determined virtual camera position and extending up to the bounding key parallax lines.

The audio device may have a single-sided arc of audio detection in some embodiments, and the key parallax lines may include the entire length of each key parallax line. Alternatively, the audio device may have a full-circle microphone array, and the key parallax lines comprise only portions of each parallax line extending beyond a pair of identified participants.

In an embodiment, audio may be filtered or substantially decorrelated, to at least partially ambiguate spatial audio cues in the captured (or rendered) audio, when potential incongruence is detected. The presence of potential incongruence in far end play back of the captured video images together with playback of the audio stream may be determined based on a location of the audio device within the conference room, as described above. The captured audio stream may be filtered in response to the determining that potential incongruence is present by decoding the captured audio stream into a plurality of channels, the plurality of channels having a structured spatial relationship. The decoding may include converting the captured audio stream into a logarithmic frequency scale. Random phase values that are band-limited may be assigned to each of the plurality of channels to modify the captured audio stream. The modified audio stream may be spline interpolated. Filters may be constructed by interpolating a full filter response between the assigned random phase values, and applied to the captured audio stream to provide an ambiguated audio stream corresponding to the captured audio stream. The filtering may further include resampling the modified audio stream and mapping the modified audio stream to a linear frequency response, the resampling and the mapping both taking place prior to the spline interpolation. The filtering may also further include adding a linear phase offset to the modified audio stream prior to the spline interpolation, the linear phase offset adding greater delay to lower frequency bands of the plurality of channels than to higher frequency bands.

Another embodiment of the present invention describes a video conferencing system. The video conferencing system may include a single camera and an audio controller communicatively coupled to the camera. The single camera may capture video images of a room in which the video conferencing system is broadcasting and receiving video conference data from. The audio controller may include a processor configured identify locations of each of a plurality of participants within an image plane of a video image of the captured video images. Using face and shape detection, the processor may calculate a location of a center point of each identified participant's torso. The processor may be further configured to calculate a region of congruence bounded only by key parallax lines, the key parallax lines being a subset of all parallax lines running through the center points of each identified participant identified based on the identified participants located closest to a determined virtual camera position within the image plane. The processor may use an audio test, a video test, or any suitable technology to identify a location of an audio device within the conference room. When the audio device location is not within the region of congruence, the processor may adjust the audio captured by the audio device, the adjusting comprising adapting a captured audio signal to reduce effects of incongruence when the captured audio is replayed at a far end of the video conference.

In addition to the foregoing, embodiments are described to increase robustness in the detection of potential incongruence. For example, an ellipse may be calculated around each calculated center point. The calculated region of congruence may be adjusted by redefining boundaries of the adjusted region of congruence to be lines from the calculated center point of an identified participant that are tangential to the ellipse around the calculated center point of each other identified participant, instead of the key parallax lines. A size of the ellipse may be set based on one of a robustness parameter and an uncertainty in the identified location of each participant.

While the foregoing describes embodiments involving a non-degenerate mapping of objects in the conference room, the invention is not limited in this regard, and can be used to identify and mitigate incongruence in an event where the camera is not a predetermined height above the audio device. A camera of a video conferencing system may capture video images of a conference room. A processor of the video conferencing system may identify locations of each of a plurality of participants within an image plane of a video image of the captured video images. Using face and shape detection, a location of a center point of each identified participant's torso may be calculated. Based on the calculated center points, an imaginary plane may be created above a horizontal plane containing the audio device. A region of congruence bounded by key parallax lines within the created imaginary plane may be calculated, the key parallax lines being a subset of all parallax lines running through the center points of each identified participant. The region of congruence may be projected to the horizontal plane containing the audio device. A location of the audio device within the conference room is identified using an audio test, a video test, and/or some other suitable technology.

The identified location of the audio device may then be compared to the calculated region of congruence within the conference room. When the audio device location is not within the region of congruence, audio captured by the audio device may be adjusted by adapting a captured audio signal to reduce effects of incongruence when the captured audio is replayed at a far end of the video conference.

What is claimed is:

1. A method for at least partially ambiguating spatial audio cues in audio in response to determining that incongruence may be present, the method comprising:
   capturing, by a camera of a video conferencing system, video images of a conference room;
   capturing, by an audio device, an audio stream from the conference room;
   determining, by a processor of the video conferencing system, that potential incongruence is present in far end play back of the captured video images together with playback of the audio stream, the potential incongruence being determined based on a location of the audio device within the conference room; and
   filtering, by the processor, the captured audio stream in response to the determining that potential incongruence is present, the filtering comprising:
      decoding the captured audio stream into a plurality of channels, the plurality of channels having a structured spatial relationship;
      assigning random phase values that are band-limited to each of the plurality of channels to modify the captured audio stream;
      constructing filters by interpolating a full filter response between the assigned random phase values; and
      applying the constructed filters to the captured audio stream to provide an ambiguated audio stream corresponding to the captured audio stream.

2. The method of claim 1, the decoding the captured audio stream comprising converting the captured audio stream into a logarithmic frequency scale.

3. The method of claim 1, the filtering further comprising resampling the modified audio stream and mapping the modified audio stream to a linear frequency response, the resampling and the mapping both taking place prior to the spline interpolation.

4. The method of claim 1, the filtering further comprising adding a linear phase offset to the modified audio stream prior to the spline interpolation, the linear phase offset adding greater delay to lower frequency bands of the plurality of channels than to higher frequency bands.

5. A non-transitory computer-readable medium storing instructions that, upon execution by one or more processors, causes the one or more processors to perform operations of at least partially ambiguating spatial audio cues in audio in response to determining that incongruence may be present, the operations comprising:
   capturing, by a camera of a video conferencing system, video images of a conference room;
   capturing, by an audio device, an audio stream from the conference room;
   determining, by a processor of the video conferencing system, that potential incongruence is present in far end play back of the captured video images together with playback of the audio stream, the potential incongruence being determined based on a location of the audio device within the conference room; and filtering, by the processor, the captured audio stream in response to the determining that potential incongruence is present, the filtering comprising:

decoding the captured audio stream into a plurality of channels, the plurality of channels having a structured spatial relationship;

assigning random phase values that are band-limited to each of the plurality of channels to modify the captured audio stream;

constructing filters by interpolating a full filter response between the assigned random phase values; and applying the constructed filters to the captured audio stream to provide an ambiguated audio stream corresponding to the captured audio stream.

6. The non-transitory computer-readable medium of claim 5, the decoding the captured audio stream comprising converting the captured audio stream into a logarithmic frequency scale.

7. The non-transitory computer-readable medium of claim 5, the filtering further comprising resampling the modified audio stream and mapping the modified audio stream to a linear frequency response, the resampling and the mapping both taking place prior to the spline interpolation.

8. The non-transitory computer-readable medium of claim 5, the filtering further comprising adding a linear phase offset to the modified audio stream prior to the spline interpolation, the linear phase offset adding greater delay to lower frequency bands of the plurality of channels than to higher frequency bands.

9. A video conferencing system configured to at least partially ambiguated spatial audio cues in audio in response to determining that incongruence may be present, the video conferencing system comprising:

a camera configured to capture video images of a conference room;

an audio device configured to capture an audio stream from the conference room; and a processor configured to perform operations comprising:

determining that potential incongruence is present in far end play back of the captured video images together with playback of the audio stream, the potential incongruence being determined based on a location of the audio device within the conference room; and filtering the captured audio stream in response to the determining that potential incongruence is present, the filtering comprising:

decoding the captured audio stream into a plurality of channels, the plurality of channels having a structured spatial relationship;

assigning random phase values that are band-limited to each of the plurality of channels to modify the captured audio stream;

constructing filters by interpolating a full filter response between the assigned random phase values; and applying the constructed filters to the captured audio stream to provide an ambiguated audio stream corresponding to the captured audio stream.

10. The video conferencing system of claim 9, the decoding the captured audio stream comprising converting the captured audio stream into a logarithmic frequency scale.

11. The video conferencing system of claim 9, the filtering further comprising resampling the modified audio stream and mapping the modified audio stream to a linear frequency response, the resampling and the mapping both taking place prior to the spline interpolation.

12. The video conferencing system of claim 9, the filtering further comprising adding a linear phase offset to the modified audio stream prior to the spline interpolation, the linear phase offset adding greater delay to lower frequency bands of the plurality of channels than to higher frequency bands.

* * * * *